United States Patent [19]

Filas et al.

[11] Patent Number: 5,266,352

[45] Date of Patent: Nov. 30, 1993

[54] DEVICES FEATURING SILICONE ELASTOMERS

[75] Inventors: Robert W. Filas, Basking Ridge; Bertrand H. Johnson, Murray Hill; Ching-Ping Wong, Lawrenceville, all of N.J.

[73] Assignee: AT&T Bell Laboratories, Murray Hill, N.J.

[21] Appl. No.: 998,106

[22] Filed: Dec. 30, 1992

Related U.S. Application Data

[60] Division of Ser. No. 944,026, Sep. 11, 1992, Pat. No. 5,217,811, which is a continuation of Ser. No. 730,379, Jul. 12, 1991, abandoned, which is a continuation of Ser. No. 354,051, May 18, 1989, abandoned.

[51] Int. Cl.$^5$ ............... B05D 5/06; C08G 77/06
[52] U.S. Cl. ................... 427/163; 427/162; 528/15; 528/31
[58] Field of Search ............ 427/162, 163; 528/15, 528/31

[56] References Cited

U.S. PATENT DOCUMENTS

| | | | |
|---|---|---|---|
| 2,915,497 | 12/1959 | Clark | 260/46.5 |
| 3,284,406 | 11/1966 | Nelson | 260/46.5 |
| 3,595,934 | 7/1971 | Butler et al. | 260/825 |
| 3,989,667 | 11/1976 | Lee et al. | 260/46.5 UA |
| 3,996,187 | 12/1976 | Travnicek | 260/375 B |
| 3,996,189 | 12/1976 | Travnicek | 260/375 B |
| 4,077,943 | 3/1978 | Sato et al. | 260/46.5 UA |
| 4,114,993 | 9/1978 | Travnicek | 351/160 |
| 4,317,616 | 3/1982 | Clarke | 427/163 |
| 4,329,029 | 5/1982 | Haskell | 354/23 D |
| 4,535,141 | 8/1985 | Kroupa | 528/15 |
| 4,560,711 | 12/1985 | Suzuki | 523/212 |
| 4,642,265 | 2/1987 | Suzuki | 428/375 |
| 4,653,893 | 3/1987 | Inoue et al. | 354/443 |
| 4,665,148 | 5/1987 | Wong | 528/15 |
| 4,701,017 | 10/1987 | Kookootsedes et al. | 350/96.34 |
| 4,719,274 | 1/1988 | Wong | 528/15 |
| 4,745,428 | 5/1988 | Miyasaka | 354/443 |
| 4,755,577 | 7/1988 | Suzuki | 528/15 |
| 4,769,668 | 9/1988 | Ishikawa et al. | 354/442 |
| 4,779,115 | 10/1988 | Fujino et al. | 354/414 |
| 4,795,234 | 1/1989 | Nakasone et al. | 427/163 |
| 4,845,164 | 7/1989 | Gutek | 528/15 |
| 4,997,260 | 3/1991 | Honjo et al. | 350/96.34 |
| 5,064,490 | 11/1991 | Chapin et al. | 427/163 |
| 5,139,816 | 8/1992 | Eckberg | 427/163 |

FOREIGN PATENT DOCUMENTS 0153414 9/1985 Japan .

OTHER PUBLICATIONS

Book, *Chemistry and Technology of Silicones* by Walter Noll, Academic Press, New York, 1968, table of contents.

Paper, "High Performance Silicone Gel as IC Device Chip Protection," *Materials Research Symposium Proceedings*, vol. 108, pp. 175–187 (1988).

Petrarch catalog, "Silicon Compounds Registrar and Review", Petrarch Systems Silanes & Silicones, 1987, p. 281.

*Primary Examiner*—Melvyn I. Marquis
*Assistant Examiner*—Karen A. Dean
*Attorney, Agent, or Firm*—Oleg E. Alber

[57] ABSTRACT

Devices are described in which certain crosslinked silicone polymers are incorporated. These polymers have various functions such as encapsulating agents, surface protective agents or agents to index match optical components (e.g. optical fiber, optical waveguide, etc.) to other optical devices or articles. The polymer is a vinyl-terminated dimethyldiphenylsiloxane copolymer crosslinked with tri- or tetrafunctional silanes in the presence of a platinum catalyst. The phenyl group content of the crosslinked silicone copolymer is adjusted to change the index of refraction of the polymer to the optimum for the particular application contemplated. Polymer preparation procedures are described which yield good optical quality for the polymer as well as optimum physical and chemical properties.

6 Claims, 3 Drawing Sheets

DEVICES FEATURING SILICONE ELASTOMERS

This is a division of application Ser. No. 07/944,026 filed Sep. 11, 1992, now U.S. Pat. No. 5,217,811 which is a continuation under Rule 1.62 of Ser. No. 07/730,379 filed Jul. 12, 1991, abandoned on Sep. 11, 1992, which is a continuation under Rule 1.62 of Ser. No. 07/354,051 filed May 18, 1989, abandoned Jul. 12, 1991.

TECHNICAL FIELD

The invention relates to articles of manufacture incorporating certain crosslinked silicone polymers. In particular, the invention relates to electronic and optical devices incorporating certain crosslinked silicone polymers as encapsulating material and/or index-matching material.

BACKGROUND OF THE INVENTION

Various articles of manufacture are made with polymer coatings or polymer parts. Such coatings may be used for protective purposes, to protect surfaces from corrosion or abrasion, to add strength to the article or to protect various parts of the article (e.g., electronic circuits) from the effects of atmospheric constituents and for various other purposes.

In the field of optical technology, there is a need for various polymer materials with unique optical and physical characteristics. In particular, there is a need for an encapsulating material (with all the desirable characteristics of encapsulating materials) which also have desirable optical properties such as low loss transmission characteristics and particular indexes of refraction.

A particularly important commercial problem in lightwave technology is the use of polymeric materials as index-matching material for connections between optical components such as between optical fiber and (1) other optical fiber, (2) optical waveguides, (3) optical detectors, (4) light sources, (5) optical lens, etc. Index matching generally requires a polymeric material with an index of refraction close to that of the core of the optical fiber. Index-matching material is required at these interfaces in order to avoid reflection losses due to discontinuities in the refractive index. In addition, it is desirable to have an inexpensive, easily made material that is stable and nontoxic, and has the requisite material characteristics to protect electronic components and optoelectronic components from the deleterious effects of the atmosphere and environment such as humidity, corrosive gases, etc. A particular example of an optoelectronic device requiring protection is a photodetector such as the various PIN photodetectors used in optical communications. Particularly desirable is a encapsulant material which is also useful for index matching one optical component or device to another (e.g. optical fiber to a PIN photodetector).

Silicone resins are used for many purposes because of their relative thermal stability, dielectric properties, chemical stability, low toxicity and resistance to atmospheric deterioration. A good general reference to the chemistry and technology of silicones is given in a book by Walter Noll entitled, "Chemistry and Technology of Silicones", Academic Press, New York, 1968. Silicone resins enjoy a wide variety of uses such as encapsulants and coatings for the electronics industry, sealants and greases, medical implants, and as the media for certain types of touch sensitive displays. In particular, silicone resins in the form of elastomers have been found to provide tough durable protection when used for the encapsulation of integrated circuit (IC) components or devices. Such silicone resins are firm enough to provide protection for fine connections, while flexible enough to allow for the expansion and contraction during ordinary operational temperature cycles. A particular useful review paper on the use of silicone elastomers for IC chip protection is contained in a paper published by C. P. Wong, Materials Research Symposium Proceedings, Vol. 108, pages 175–187 (1988).

U.S. Pat. No. 4,665,148 of C. P. Wong, and its division, U.S. Pat. No. 4,719,274, describe a method of forming a silicone gel by reacting a first silicone polymer having pendant vinyl groups with a second silicone polymer having pendant hydrides. The vinyl groups react with the hydrides, in the presence of a platinum catalyst, to crosslink the polymers into the desired gel.

Various references contain discussions of polymer compositions including organopolysiloxane polymer compositions that are transparent and suitable for various applications to optical technology. U.S. Pat. No. 4,560,711 issued to T. Suzuki on Dec. 24, 1985, discloses various organopolysiloxane compositions. U.S. Pat. No. 3,996,189 and U.S. Pat. No. 4,114,993, both issued to E. A. Travnicek on Dec. 7, 1976 and Sep. 19, 1978 disclose various silicone polymers suitable for optical applications, particularly for contact lenses and intraocular implants. See also, U.S. Pat. No. 3,996,187 issued to E. A. Travnicek on Dec. 7, 1976, where a filed polysiloxane is used to make soft contact lenses.

Vinyl-terminated dimethyldiphenyl siloxane copolymer is available commercially from Hüls American, Petrarch Systems Silanes and Silicones, Catalog entitled Silicon Compounds, Register and Review, Bartram Road, Bristol, Pa. 19007, page 281.

SUMMARY OF THE INVENTION

The invention is an article of manufacture comprising a crosslinked siloxane copolymer made by crosslinking a vinyl-terminated dimethyldiphenylsiloxane copolymer with certain tri- or tetrafunctional silanes in the presence of one or more particular platinum catalysts. The article of manufacture generally involves an optical fiber or optical waveguide and the composition adjusted so the index of refraction of the polymer matches that of the core of the optical fiber. The index of refraction of the crosslinked siloxane copolymer may be varied by changing the phenyl group content. Preferred is a phenyl group content of 10 to 20 mole percent (remainder methyl groups) because this composition yields an index of refraction of the crosslinked siloxane copolymer most useful for device applications. In addition, the crosslinked siloxane copolymer has excellent properties as a surface protective agent.

Important in the practice of the invention are the specific crosslinking agents and platinum catalyst used so as to produce crosslinked polymer material with high optical quality. Specifically, the preferred crosslinking agent is selected from either phenyltris(dimethylsiloxy)silane and 1,3-diphenyl-1,1,3,3-tetrakis(dimethylsiloxy)-disiloxane or mixtures of these two silanes and the preferred catalyst is chloroplatonic acid complexed with cyclic vinylmethylsiloxanes. The two crosslinking agents given above are preferred because they are highly miscible in the vinyl-terminated siloxane copolymer and yield crosslinked polymer material that is clear, uniform, free of scattering centers and with excellent optical properties. Similarly, the catalyst is chosen because it is highly miscible and not too reactive (so as to yield reasonable gel times). Both catalyst and crosslinking agent have high boiling points so degassing can be carried out without removal of catalyst or crosslinking agent. Typical structures are junctions between two or more fibers, junction of fiber and optical waveguide, device comprising junction between optical fiber and optical detector (e.g. PIN detector) and device comprising junction between optical fiber and optical source such as laser or light emitting diode.

DETAILED DESCRIPTION

Figure 1:
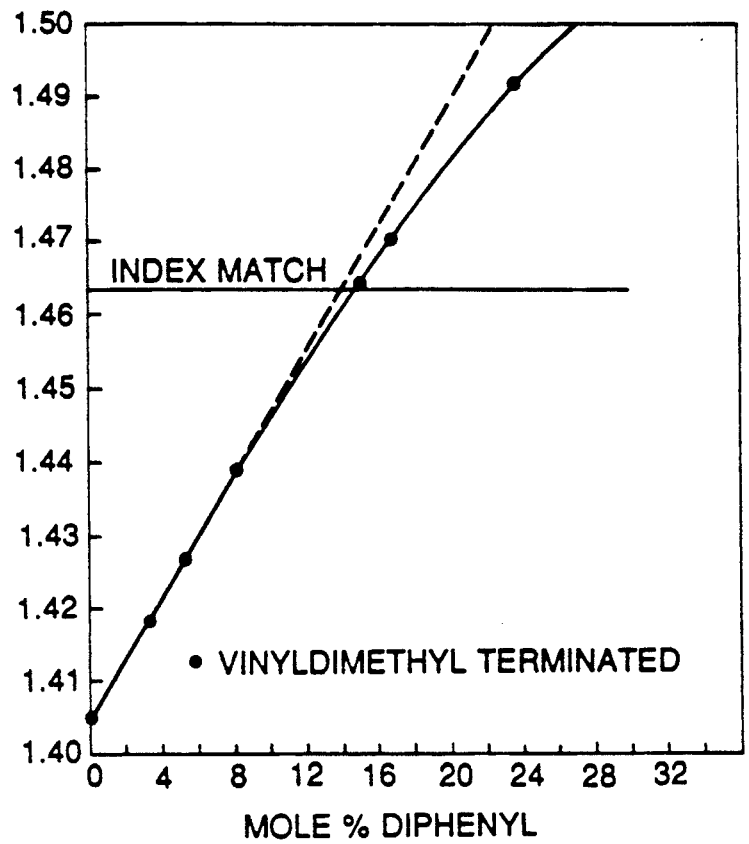
FIG. 1 shows data in the form of a graph of the increase in index of refraction of vinyl-terminated dimethyldiphenylsiloxane copolymer as a function of phenyl-group content.

The invention is based on the discovery that vinyl-terminated dimethyldiphenyl siloxane copolymer when crosslinked with certain specific tri- or tetrafunctional silanes in the presence of a certain catalyst yields crosslinked siloxane polymer material of excellent optical quality and excellent encapsulant properties (e.g. stable, able to afford environmental protection) in which the index of refraction of the polymer is such as to make the crosslinked polymer extremely useful for minimizing reflective losses in optical communication systems and optical devices. The starting material for production of the crosslinked polymer is a siloxane copolymer chain with vinyl termination groups

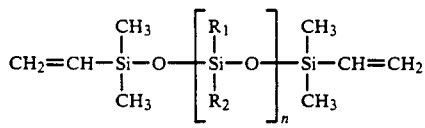

in which $R_1$ and $R_2$ may or may not be the same, are composed of methyl or phenyl groups and comprise 10-20 mole percent phenyl groups, with the remainder methyl groups. The molecular weight of the vinyl-terminated uncrosslinked copolymer may vary over large limits, typically from about 1000 to 250,000 (n=10-2750) but 8,000 to 25,000 (n=80-275) yield excellent mechanical properties and excellent encapsulation properties. Typically, a silicone elastomer can be made from dimethylsiloxane, diphenylsiloxane and methylphenyl siloxane so as to obtain a copolymer or terpolymer with the desired composition of phenyl and methyl groups. Generally, for ease of synthesis, convenience, and reduced cost, just dimethyl siloxane and diphenyl siloxane are used so as to obtain a dimethyldiphenylsiloxane copolymer with the structure

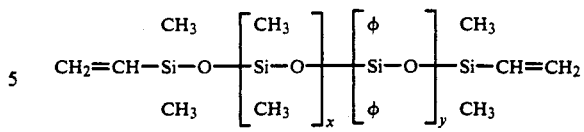

where y ranges from 0.1 to 0.2. Preferred range for y is from 0.13 to 0.17 and most preferred is $y=0.15\pm0.01$ because these compositions yield an index of refraction close to that of the core of typical optical fibers. Here, $\psi$ represents a phenyl group. For convenience, the uncrosslinked copolymer is often identified as vinyl-terminated dimethyldiphenylsiloxane copolymer even though it is recognized that methylphenylsiloxane monomer may be used to make the uncrosslinked copolymer as well as dimethylsiloxane monomer and diphenylsiloxane monomer. Also, the identity of the uncrosslinked siloxane copolymer is set forth in terms of the mole percent of phenyl groups present in the copolymer.

An important aspect of the invention is the identity of the crosslinking agents used to produce the crosslinked polymer material of the invention. A variety of crosslinking agents are useful in the practice of the invention including various trifunctional and tetrafunctional silanes. Two particular crosslinking agents have been found to yield crosslinked polymer material with good mechanical properties which in addition have unusually good encapsulation properties and exhibit excellent optical properties. These two crosslinking agents are phenyltris(dimethylsiloxy)silane and 1,3-diphenyl-1,1,3,3-tetrakis(dimethylsiloxy)disiloxane. Mixtures of these two crosslinking agents are also preferred. A variety of platinum catalysts may be used in the practice of the invention. Excellent results are obtained with one particular catalyst, namely a platinum-cyclovinylmethylsiloxane complex. This catalyst is miscible with the starting material, is not too reactive (has a reasonable gel time), and yields crosslinked polymer with low optical loss and good optical quality. Generally, the crosslinking procedure is carried out as follows. The catalyst is mixed with the vinyl-terminated dimethyldiphenylsiloxane and degassed. This mixture is added to the crosslinking agent, mixed, and again degassed. This mixture is applied to the device and curing is effected either by allowing the mixture to stand at room temperature for 1-10 hours or heating (typically to about 100°-150° C.) for a shorter time. Higher temperatures may be used but generally no advantage are obtained and very high temperatures (above about 250° to 300° C.) are avoided because of decomposition of the polymer. Composition of the mixture is an important variable in determining the mechanical properties of the crosslinked polymer and the gel time of the mixture. Composition of the mixture of crosslinking agent and vinyl-terminated siloxane is given in terms of the ratio of number of hydride groups on the crosslinking agent (Si-H groups) to number of vinyl groups on the vinyl-terminated siloxane starting material (hydride/vinyl ratio). This ratio may vary over large limits but best results are obtained with the ratio in the range from 0.1 to 6. Below 0.1, the crosslinked polymer remains very gel-like (low modulus), and above 6, the crosslinked polymer becomes too brittle. For a gel-type product, it is preferred that the ratio be in the range 0.2 to 0.6. For a solid crosslinked polymer product, the preferred range is 0.8 to 2. Most preferred are ratios in the range from 0.8 to 1.2. Further, these ratios of hydride/vinyl yield very convenient gel times (about one hour to 10 hours) and excellent mechanical and optical properties. Catalyst concentrations varied from about 50 to 1000 part per million (ppm) by weight of the chloroplatonic acid-cyclovinylmethylsiloxane complex. This complex is about 2.0% platinum so that in terms of platinum, the preferred range is from 1-20 parts per million platinum.

FIG. 1 shows a graph of data on the index of refraction of vinyldimethyl-terminated dimethyldiphenylsiloxane as a function of percent phenyl groups. By careful adjustment of phenyl-group content, the index of refraction of the crosslinked polymer can be matched to the fiber core (generally about $n_D = 1.463$ at 25° C. This corresponds to a phenyl group content of about 15 mole percent.

Figure 2:
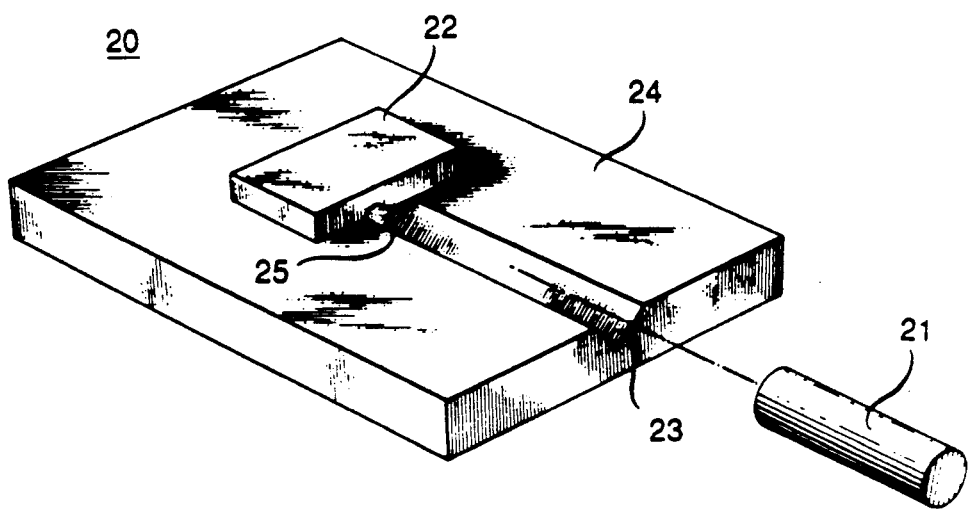
FIG. 2 shows a diagram of a device incorporating an optical fiber coupled into an optical detector featuring use of the crosslinked siloxane copolymer between fiber and detectors.

The invention is well illustrated by a description of a number of devices incorporating the crosslinked siloxane. FIG. 2 shows an optical subassembly 20 with optical fiber 21 coupled into a light detector 22 (usually a PIN light detector). The optical fiber 21 is mounted in the V-groove 23 of a silicon substrate 24 and the space between optical fiber and optical detector 25 is filed with crosslinked siloxane to provide optical matching of fiber to detector (minimize refections), to provide mechanical support to the structure and as an encapsulant for fiber and detector.

Figure 3A:
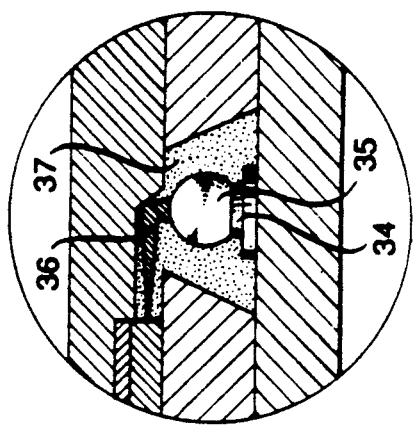
FIG. 3 shows a drawing of an LED device coupled into an optical fiber featuring use of the crosslinked siloxane copolymer.
Figure 3:
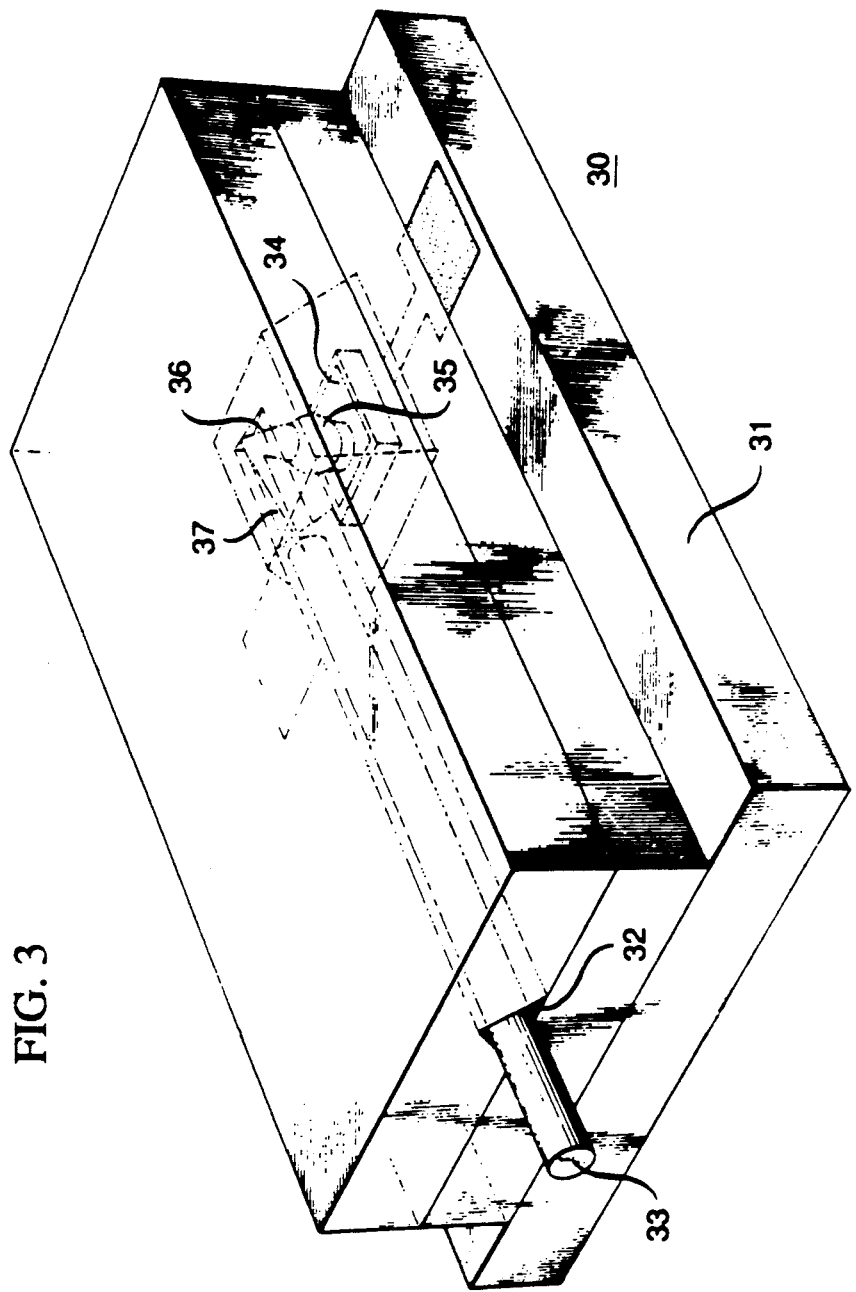

FIG. 3 shows a silicon based LED package 30 featuring a silicon substrate 31 with V-groove 32 and optical fiber 33. The LED 34 emits light through a lens 35 and this light is reflected from a mirror 36 and into the fiber 33. The entire space 37 containing LED 34, lens 35, mirror 36 and end of optical fiber 33 is filled with crosslinked polymer to provide optical matching from lens to fiber and to provide mechanical stability as well as encapsulation of the various components.

Figure 4:
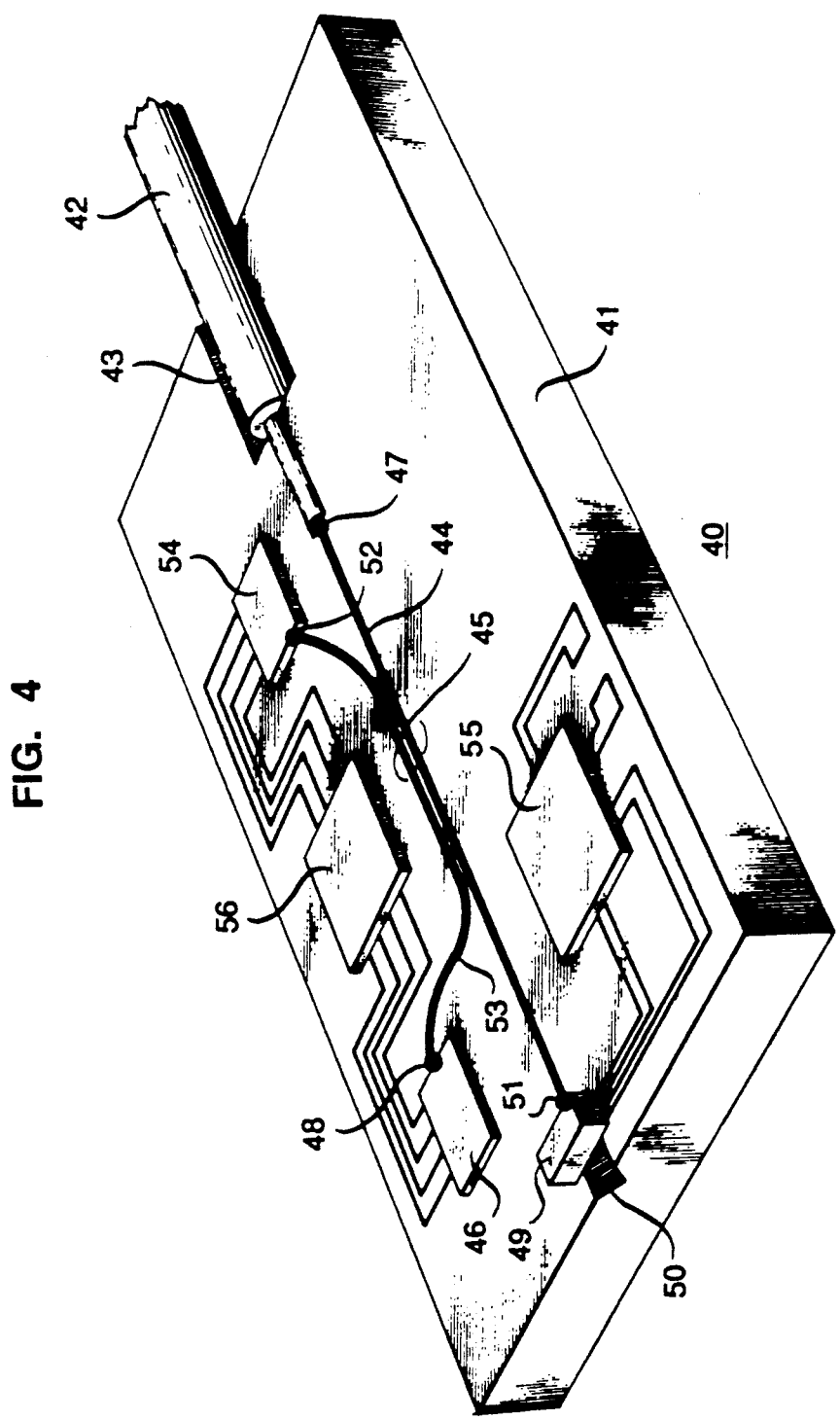
FIG. 4 shows a drawing of a terminal package for a laser, two-way, optical communication system featuring various optical junctions with the crosslinked siloxane copolymer.

FIG. 4 shows a drawing of an optical communication terminal package 40 with both transmission and receiving parts. The package is mounted on a silicon substrate 41 and features an optical fiber 42, aligned in a V-groove 43 and coupled to a waveguide section 44. Also featured is a coupler 45 to couple energy out of the waveguide and into a PIN photodetector 46. The space 47 between fiber 42 and waveguide 44 is filled with the crosslinked siloxane polymer as well as the space 48 between waveguide and PIN photodetector 46. The package also features a laser source 49, aligned in a V-groove 50 and coupled into the optical waveguide 44. The coupling 51 between laser 49 and waveguide 44 is also filled with crosslinked polymer material in accordance with the invention. Power from the laser is coupled through the waveguide coupler 45 into a PIN power monitor 54 featuring a PIN photodetector. Here also, the coupling 52 between waveguide 53 and photodetector 54 is filled with crosslinked siloxane to reduce or eliminate optical reflections. In addition, the electronic components such as laser driver 55, and receiver electronics 56 as well as optical components such as photodetectors 46, 54 are encapsulated with the crosslinked siloxane polymer to provide mechanical stability and protection from atmospheric contaminants.

We claim:

1. A process of fabricating an article of manufacture comprising at least one optical component and a crosslinked siloxane copolymer in contact with the at least one optical component, which comprises, preparing a catalyst-copolymer crosslinking mixture refractive index matched to the at least one optical component, placing the mixture in contact with the at least one optical component, and heating to produce the crosslinked siloxane copolymer, wherein said mixture is prepared by a) mixing a platinum catalyst with vinyl-terminated dimethyldiphenyl siloxane copolymer to form catalyst-uncrosslinked copolymer mixture, the mole percent of phenyl groups being selected from within a range of from 10 to 20 mole percent to match refractive index of the crosslinked siloxane copolymer to the refractive index of the optical component, b) degassing catalyst-uncrosslinked copolymer mixture, c) mixing the catalyst-uncrosslinked copolymer mixture with a crosslinking agent to form catalyst-copolymer cross-linking mixture, said crosslinking agent being miscible with the uncrosslinked copolymer mixture and being at least one selected from the group consisting of phenyltris (dimethylsiloxy) silane and 1,3diphenyl-1,1,3,3-tetrakis (dimethylsiloxy) disiloxane and the ratio of hydride groups in the crosslinking agent to vinyl groups in the vinyl-terminated dimethyldiphenyl siloxane being between 0.1 and 6.

2. The process of claim 1 in which the at least one optical component is an optical fiber and said crosslinked siloxane copolymer optically interconnects the optical fiber to at least one other optical component selected from an optical fiber, an optical waveguide, a laser, a light emitting diode and a photodiode.

3. The process of claim 1 in which the ratio of hydride to vinyl groups is between 0.2 and 0.6.

4. The process of claim 1 in which the ratio of hydride to vinyl groups is between 0.8 and 2.

5. The process of claim 4 in which the ratio of hydride to vinyl groups is between 0.8 and 1.2.

6. The process of claim 2 in which the concentration of platinum catalyst in terms of weight of platinum in the catalyst-copolymer-crosslinking mixture is between 1 and 20 parts per million.

* * * * *